US011328031B2

(12) United States Patent
Decrop et al.

(10) Patent No.: US 11,328,031 B2
(45) Date of Patent: May 10, 2022

(54) AUTOMATICALLY GENERATED TIMESTAMPS BASED ON COMMENT

(71) Applicant: International Business Machines Corporation, Armonk, NY (US)

(72) Inventors: Clement Decrop, Arlington, VA (US); Martin G. Keen, Cary, NC (US); Zachary A. Silverstein, Jacksonville, FL (US); Jeremy R. Fox, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/926,657

(22) Filed: Jul. 11, 2020

(65) Prior Publication Data
US 2022/0012298 A1    Jan. 13, 2022

(51) Int. Cl.
*G06F 16/783* (2019.01)
*G06F 16/955* (2019.01)
*G06F 16/958* (2019.01)
*G06F 40/30* (2020.01)
*G06N 20/00* (2019.01)

(52) U.S. Cl.
CPC ........ *G06F 16/9558* (2019.01); *G06F 16/972* (2019.01); *G06F 40/30* (2020.01); *G06N 20/00* (2019.01)

(58) Field of Classification Search
CPC .... G06F 16/71; G06F 16/972; G06F 16/7844; G06F 16/7867; G06F 16/9558; G06F 40/30; G06N 20/00; H04N 21/234345; H04N 21/26603; H04N 21/44008
See application file for complete search history.

(56) References Cited

U.S. PATENT DOCUMENTS 5,794,249 A  *  8/1998  Orsolini ................. G11B 27/10
                                              704/200
6,473,778 B1 * 10/2002  Gibbon ................. G06F 40/103
                                              715/201

(Continued)

FOREIGN PATENT DOCUMENTS

CN      104113787 A    10/2014
WO      2015006369 A    1/2015

OTHER PUBLICATIONS

Disclosed Anonymously et al, "Self-Correcting Video Tagging Based on Aggregate User Readjustment", ip.com Prior Art Database Technical Disclosure, IPCOM000261768D, Apr. 2, 2020, pp. 1-4.

(Continued)

*Primary Examiner* — Wilson W Tsui
(74) *Attorney, Agent, or Firm* — Stephanie L. Carusillo

(57) ABSTRACT

In an approach for automatically generating and adding a timestamp to a comment left by a user on a media post based on a specific part of the media post referenced in the comment, responsive to receiving a comment on a media post, a processor completes a visual analysis and linguistic analysis of the media post. A processor completes a linguistic analysis of the comment. A processor performs a linguistic intent correlation analysis to determine a part of the media post that correlates to the comment. A processor determines a timestamp for the part of the media post. A processor adds the timestamp to the comment.

17 Claims, 3 Drawing Sheets

(56) References Cited

U.S. PATENT DOCUMENTS

| | | | |
|---|---|---|---|
| 7,382,933 B2* | 6/2008 | Dorai | G06F 16/7834 |
| | | | 382/276 |
| 8,332,886 B2 | 12/2012 | Lanza | |
| 8,819,719 B1 | 8/2014 | Chen | |
| 8,994,311 B1* | 3/2015 | Lynch | G06F 16/958 |
| | | | 318/565 |
| 9,066,145 B2 | 6/2015 | Kilar | |
| 9,407,974 B2 | 8/2016 | Kuznetsov | |
| 9,681,201 B2 | 6/2017 | Maruyama | |
| 10,057,651 B1* | 8/2018 | Singh | H04N 21/4623 |
| 10,425,378 B2 | 9/2019 | Gandhi | |
| 2008/0209480 A1* | 8/2008 | Eide | H04N 21/84 |
| | | | 725/87 |
| 2009/0013252 A1* | 1/2009 | DeWitt | G11B 27/034 |
| | | | 715/716 |
| 2011/0299832 A1* | 12/2011 | Butcher | H04N 21/41407 |
| | | | 386/248 |
| 2012/0265328 A1* | 10/2012 | Kadirkamanathan | |
| | | | H04L 65/1069 |
| | | | 700/94 |
| 2012/0330968 A1* | 12/2012 | Lee | G06F 16/951 |
| | | | 707/748 |
| 2013/0215279 A1 | 8/2013 | Rivas-Micoud | |
| 2014/0248040 A1* | 9/2014 | Miller | H04N 9/8715 |
| | | | 386/285 |
| 2014/0337126 A1 | 11/2014 | Ohanyan | |
| 2017/0193075 A1* | 7/2017 | Hegelich | G06N 20/00 |
| 2017/0364600 A1* | 12/2017 | Sadauskas, Jr. | G06F 16/248 |
| 2018/0041463 A1 | 2/2018 | Liao | |
| 2018/0041807 A1 | 2/2018 | Shen | |
| 2019/0258671 A1* | 8/2019 | Bou | G06K 9/00751 |
| 2019/0342634 A1 | 11/2019 | Folgner | |
| 2019/0356897 A1 | 11/2019 | Karivaradaswamy | |

OTHER PUBLICATIONS

Eves, "How To Add A Timestamp I ink In Your YouTube Video Description", YouTube, Nov. 6, 2014, pp. 1-2 , <https://www.youtube.com/watch?v=tBiPumGnVT4>.

IBM, "Content delivery Services", [retrieved on Apr. 28, 2020], Retrieved from the Internet, 1 page, Accessed Apr. 28, 2020, <https://www.ibm.com/us-en/marketplace/content-delivery-services/resources>.

IBM, IBM Cloud content Delivery Network, [retrieved on Apr. 28, 2020] Retrieved from the Internet, pp. 1-10, <https://www.ibm.com/cloud/cdn>.

Justin, "Video Featured Snippets" How Suggested Clips Work, BRIGGSBY,pp. 1-17, Aug. 1, 2018, <https://www.briggsby.com/video-featured-snippets-suggested-clips>.

Ma et al., "LiveBot: Generating Live Video Comments Based On Visual And Textual Contexts" In: The Thirty-Third AAAI-19 Conference on Artificial Intelligence, Jan. 27, 2019, pp. 6810-6817.

Polin, "How To Jump To A Specific Time On You Tube In The Description Or Comment", YouTube, Jun. 9, 2014, p. 1-2, <https://www.youtube.com/watch?v=SRT9-yPKKig>.

Unknown, "Discover Video Traffic Sources", YouTube Help, 1 pg., [retrieved on Apr. 28, 2020],<https://support.google.com/youtube/answer/1714921?hl=en>.

Viana, P, "A Collaborative Approach For Semantic Time-Based Video Annotation Using Gamification" Human-centric Computing and Information Sciences, 7:13, Apr. 12, 2017, DOI 10.1186/s13673-017-0094-5, pp. 1-21.

Yarmand et al., "Can You Believe [1 :21] ?!: Content And Time-Based Reference Patterns In Video Comments", ACM Digital Library ISBN 978-1-4503-5970-2/19/05, Paper 489, CHI 2019, May 2019, pp. 1-12.

Zhang et al., "DCA: Diversity Co-Attention Towards Informative Live Video Commenting", arXiv:1911.02739v2[cs CV [, Apr. 4, 2020, 11 pages, <https://arxiv.org/pdf/1911.02739.pdf>.

* cited by examiner

AUTOMATICALLY GENERATED TIMESTAMPS BASED ON COMMENT

BACKGROUND

The present invention relates generally to the field of data processing, and more particularly to automatically generating timestamps based on a comment.

Commenting by user on media posts on websites, video platforms, social media platforms, etc. has become commonplace today. A media post can be a livestreamed or pre-recorded/completed video and/or audio clip that is posted on a website, video platform, social media platform, etc. that allows for commenting by users. For example, a user can leave a comment on a social media post of a pre-recorded news video in which the user comments on and/or reacts to the social media post in the comment.

SUMMARY

Aspects of an embodiment of the present invention disclose a method, computer program product, and computer system for automatically generating media timestamps based on a comment. Responsive to receiving a comment on a media post, a processor completes a visual analysis and linguistic analysis of the media post. A processor completes a linguistic analysis of the comment. A processor performs a linguistic intent correlation analysis to determine a part of the media post that correlates to the comment. A processor determines a timestamp for the part of the media post. A processor adds the timestamp to the comment.

In some aspects of an embodiment of the present invention, a processor updates the timestamp based, at least in part, on completing an aggregate user re-adjustment analysis for the timestamp.

In some aspects of an embodiment of the present invention, the visual analysis of the media post is performed using a Convolution Neural Network (CNN).

In some aspects of an embodiment of the present invention, a processor determines whether the comment provides uni-variant correlation, temporal correlation, and/or multi-variant correlation to the media post.

In some aspects of an embodiment of the present invention, responsive to determining the comment provides multi-variant correlation to the media post, a processor performs Term Frequency-Inverse Document Frequency (TF-IDF) on each correlation to derive which correlation is most relevant to the comment.

In some aspects of an embodiment of the present invention, a processor automatically generates and adds the timestamp to the comment, wherein the timestamp is a clickable link to a time in the media post.

DETAILED DESCRIPTION

Figure 1:
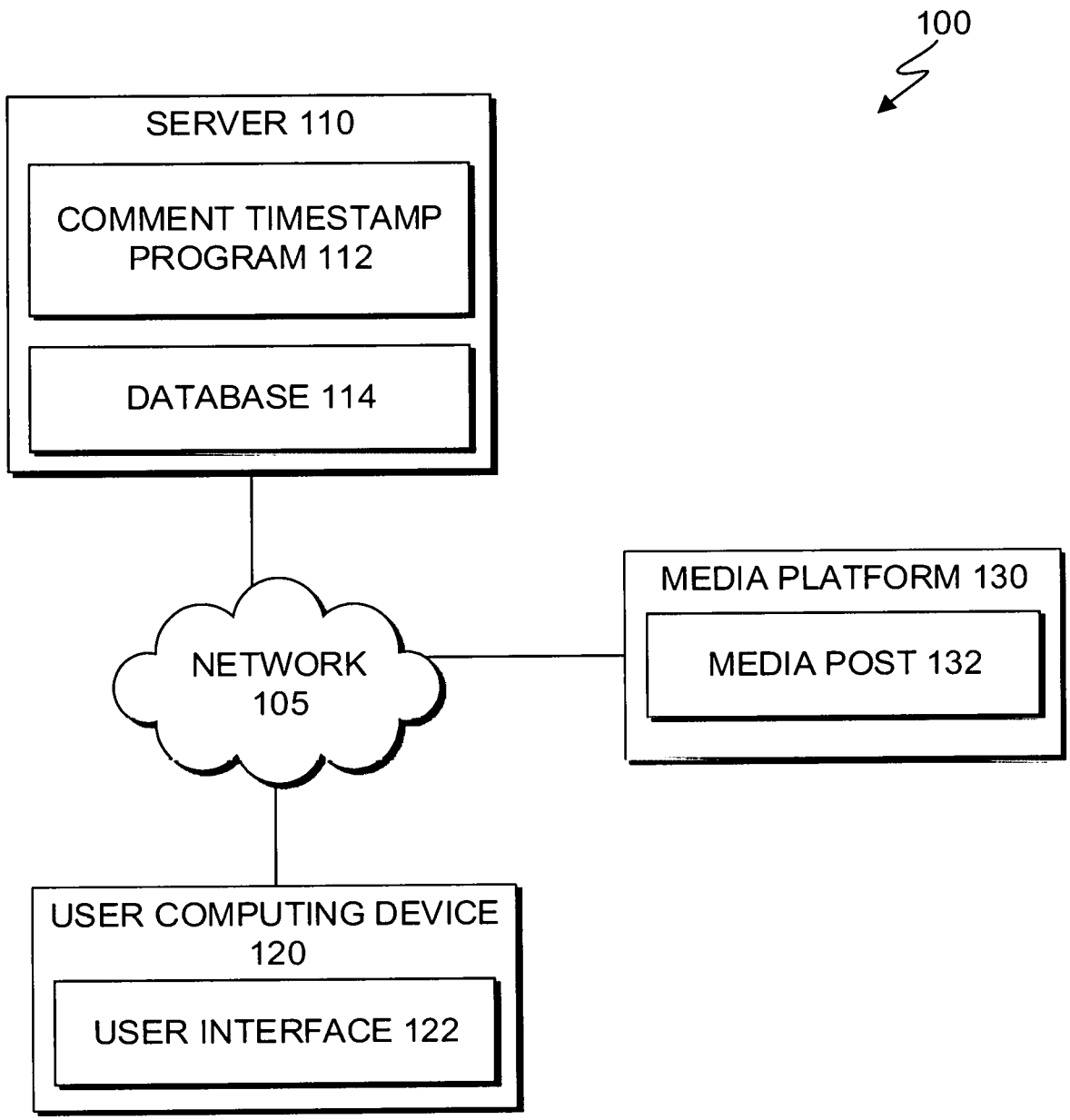
FIG. 1 depicts a block diagram of a distributed data processing environment, in accordance with an embodiment of the present invention.

Embodiments of the present invention recognize that commenting on media (i.e., video clips, video livestreams, audio clips, and audio livestreams) on websites, video platforms, social media platforms etc. has become commonplace today. As used herein, the term "media post" refers to a livestreamed or pre-recorded/completed video and/or audio clip that is posted on a website, video platform, social media platform, etc. that allows for commenting by users. For example, a user can leave a comment on a social media post of a pre-recorded news video in which the user comments on and/or reacts to the social media post in the comment. Comments on media posts can include general reactions or feelings about a media post, e.g., for a music video post, a user comments "she has an amazing voice", or can include specific references to a part of a media post, e.g., for a science lecture, a user comments "that electromagnetic waves experiment sounds really cool". When a user leaves a comment on, e.g., a social media post of a video in which the comment mentions a specific part of the video, another user would have to scroll through the video to find the exact part that the comment referenced. Embodiments of the present invention recognize the need for a way to determine a timestamp of the specific part of the video referenced in a comment and enable a user to jump to that timestamp in the video.

Embodiments of the present invention provide a system and associated methods for automatically generating and adding a timestamp to a comment left by a user on a media post based on a specific part of the media post referenced in the comment. Embodiments of the present invention are able to self-correct a generated timestamp based on aggregate user readjustment after clicking the original timestamp. Embodiments of the present invention can be utilized by systems that stream video content and enable viewers to comment, e.g., videos, TV shows, video platforms, music streaming, stream casting, enhanced audio, and hybrid delivery mechanisms for smart TVs, tablets, phones, phablets, etc.

Embodiments of the present invention enable filtering of comments on a media post based on a specific location or geofenced area specified by a user to filter the timestamped comments allowing for further segmentation of comments and usage thereof. Embodiments of the present invention enable a user to define subgroups for different sections of a media post, e.g., split a video into three parts (Part A, Part B, and Part C). This allows the user to see comments with timestamps based on the part of the media post that the user is commenting on.

The present invention may contain various accessible data sources, such as server 110 media platform 130, and user computing device 120, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Comment timestamp program 112 enables the authorized and secure processing of personal data. Comment timestamp program 112 provides informed consent, with notice of the collection of personal data, allowing the user to opt in or opt out of processing personal data.

Consent by a user can take several forms. Opt-in consent can impose on the user to take an affirmative action before personal data is processed. Alternatively, opt-out consent can impose on the user to take an affirmative action to prevent the processing of personal data before personal data is processed. Comment timestamp program 112 provides information regarding personal data and the nature (e.g., type, scope, purpose, duration, etc.) of the processing. Comment timestamp program 112 provides the user with copies of stored personal data. Comment timestamp program 112 allows the correction or completion of incorrect or incomplete personal data. Comment timestamp program 112 allows the immediate deletion of personal data.

The present invention will now be described in detail with reference to the Figures.

FIG. 1 depicts a functional block diagram illustrating distributed data processing environment 100, in accordance with an embodiment of the present invention. The term "distributed" as used herein describes a computer system that includes multiple, physically distinct devices that operate together as a single computer system. FIG. 1 provides only an illustration of one embodiment of the present invention and does not imply any limitations with regard to the environments in which different embodiments may be implemented. Many modifications to the depicted environment may be made by those skilled in the art without departing from the scope of the invention as recited by the claims.

In the depicted embodiment, distributed data processing environment 100 includes server 110, computing device 120, and media platform 130 interconnected over network 105. In an embodiment, distributed data processing environment 100 represents a system for automatically generating and adding a timestamp to a comment left by a user on a media post based on a specific part of the media post referenced in the comment. Network 105 can be, for example, a local area network (LAN), a wide area network (WAN) such as the Internet, or a combination of the two, and can include wired, wireless, or fiber optic connections. Network 105 can include one or more wired and/or wireless networks that are capable of receiving and transmitting data, voice, and/or video signals, including multimedia signals that include voice, data, and video information. In general, network 105 can be any combination of connections and protocols that will support communications between server 110, computing device 120, and media platform 130. Distributed data processing environment 100 may include additional servers, computers, or other devices not shown.

Server 110 operates to run comment timestamp program 112 and manage database 114. In the depicted embodiment, server 110 contains comment timestamp program 112 and database 114. In some embodiments, server 110 can be a standalone computing device, a management server, a web server, a mobile computing device, or any other electronic device or computing system capable of receiving, sending, and processing data. In some embodiments, server 110 may be a laptop computer, tablet computer, netbook computer, personal computer (PC), a desktop computer, a smart phone, or any programmable electronic device capable of communicating with computing device 120 and/or media platform 130 via network 105. In other embodiments, server 110 represents a server computing system utilizing multiple computers as a server system, such as a cloud computing environment. In yet other embodiments, server 110 represents a computing system utilizing clustered computers and components (e.g., database server computers, application server computers, etc.) that act as a single pool of seamless resources when accessed within distributed data processing environment 100. Server 110 may include components as described in further detail in FIG. 3.

Comment timestamp program 112 operates to automatically generate and add a timestamp to a comment left by a user on a media post based on a specific part of the media post referenced in the comment. In an embodiment, comment timestamp program 112 completes visual and linguistic analysis of a comment left on a media post, determines that the comment references a part of the media post using linguistic intent correlation analysis, determines a timestamp for the part of the media post references in the comment, and adds the timestamp to the comment enabling a user to click on the timestamp. In the depicted embodiment, comment timestamp program 112 resides on server 110 with user interface 122 being a local app interface of comment timestamp program 112 running within media platform 130 on computing device 120. In other embodiments, comment timestamp program 112 may reside on another device (not shown) provided that comment timestamp program 112 has access to network 105. Comment timestamp program 112 is described in more detail below with reference to FIG. 2.

Database 114 operates as a repository for data received, used, and/or output by comment timestamp program 112. Data received, used, and/or generated may include, but is not limited to, data associated with media post 132 streaming or posted within media platform 130; text of comments received on media post 132; and any other data received, used, and/or output by comment timestamp program 112. Database 114 can be implemented with any type of storage device capable of storing data and configuration files that can be accessed and utilized by server 110, such as a hard disk drive, a database server, or a flash memory. In an embodiment, database 114 is accessed by server 110, comment timestamp program 112, and/or computing device 120 to store and/or to access the data. In the depicted embodiment, database 114 resides on server 110. In another embodiment, database 114 may reside on another computing device, server, cloud server, or spread across multiple devices elsewhere (not shown) within distributed data processing environment 100, provided that database 114 has access to network 105.

Computing device 120 operates to send and receive data through a user interface. In some embodiments, computing device 120 may be, but is not limited to, an electronic device, such as a laptop computer, a tablet computer, a netbook computer, a personal computer (PC), a desktop computer, a smart phone, or any programmable electronic device capable of running user interface 122 and communicating (i.e., sending and receiving data) with server 110, media platform 130, and/or comment timestamp program 112 via network 105. In some embodiments, computing device 120 represents one or more programmable electronic devices or combination of programmable electronic devices capable of executing machine readable program instructions and communicating with server 110 and/or other computing devices within distributed data processing environment 100 via a network, such as network 105. In an embodiment, computing device 120 represents one or more devices associated with a user. In the depicted embodiment, computing device 120 includes an instance of user interface 122. Computing device 120 may include components as described in further detail in FIG. 3.

User interface 122 operates as a local user interface on computing device 120 through which one or more users of computing device 120 interact with computing device 120. In some embodiments, user interface 122 is a graphical user interface (GUI), a web user interface (WUI), and/or a voice user interface (VUI) that can display (i.e., visually), present (i.e., audibly), and/or enable a user to enter or receive information (i.e., graphics, text, and/or sound) for or from comment timestamp program 112 via network 105. In an embodiment, user interface 122 enables a user to send and receive data (i.e., to and from comment timestamp program 112 via network 105, respectively). In an embodiment, user interface 122 enables a user to enter a comment on a media post on a media platform, e.g., media post 132 on media platform 130. In an embodiment, user interface 122 enables a user to see a generated time stamp on a comment on a media post on a media platform.

Media platform 130 operates as a web-based technology that enables the development, deployment, and management of media solutions and services. In an embodiment, media platform 130 enables user to view and/or share media, i.e., videos, audio recordings, live streams, etc. Media post 132 represents any type of media that is posted or shared to media platform 130 for viewing by users. In an embodiment, media platform 130 enables users to leave comments on media posts for other users to view. Comments on media posts can include general reactions or feelings about a media post, e.g., for a music video post, a user comments "she has an amazing voice", or can include specific references to a part of a media post, e.g., for a science lecture, a user comments "electromagnetic waves sounds really cool".

Figure 2:
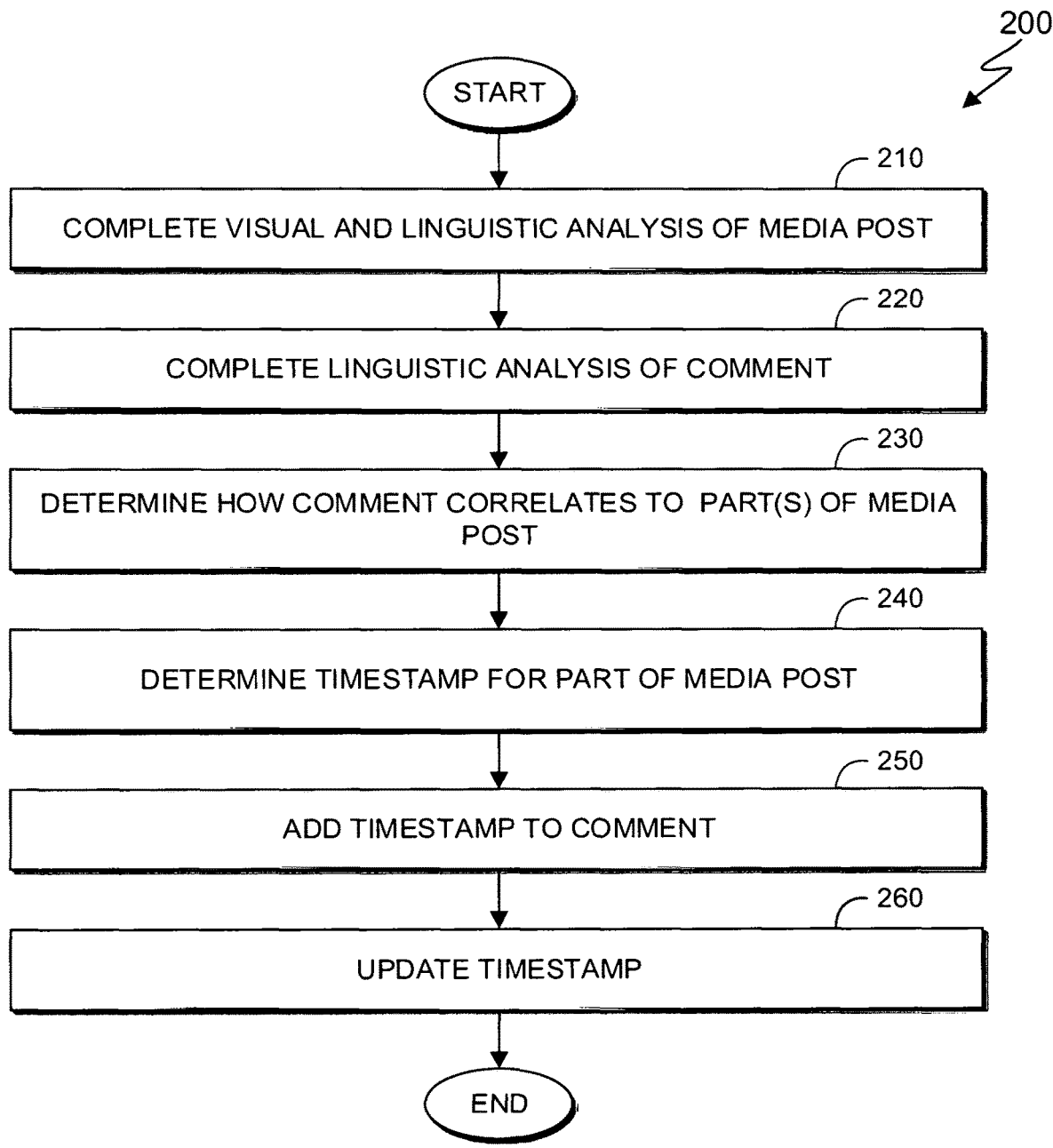
FIG. 2 depicts a flowchart of the steps of a comment timestamp program, for automatically generating and adding a timestamp to a comment left by a user on a media post based on a specific part of the media post referenced in the comment, in accordance with an embodiment of the present invention.

FIG. 2 depicts a flowchart 200 of the steps of comment timestamp program 112, for automatically generating and adding a timestamp to a comment left by a user on a media post based on a specific part of the media post referenced in the comment, in accordance with an embodiment of the present invention. In an embodiment, comment timestamp program 112 completes visual and linguistic analysis of a comment left on a media post, determines that the comment references a part of the media post using linguistic intent correlation analysis, determines a timestamp for the part of the media post references in the comment, and adds the timestamp to the comment enabling a user to click on the timestamp. It should be appreciated that the process depicted in FIG. 2 illustrates one possible iteration of comment timestamp program 112, which initiates and repeats for each comment received on a media post.

In step 210, comment timestamp program 112 completes a visual and a linguistic analysis of a media post. In an embodiment, responsive to receiving a comment on a media post, comment timestamp program 112 completes a visual and a linguistic analysis of the media post. In an embodiment, for a media post that has a video element, comment timestamp program 112 completes a visual analysis of the media post using any unsupervised or supervised machine learning object classifier known to a person of skill in the art, e.g., a Convolutional Neural Network (CNN). In an embodiment, comment timestamp program 112 completes a visual analysis of the media post using a CNN to analyze each video frame to categorize and/or classify objects, people, and/or environments portrayed in the media post. In an embodiment, comment timestamp program 112 completes a linguistic analysis of the media post using Natural Language Processing (NLP) to categorize and/or classify a transcript of the media post, in which the transcript is generated using voice recognition and speech-to-text techniques or is automatically generated from closed captions. In an embodiment, comment timestamp program 112 stores the visual and linguistic analysis categorizations and/or classifications in a database, e.g., database 114.

In some embodiments in which a subsequent comment is left on the already visually and linguistically analyzed media post, comment timestamp program 112 skips step 210 and begins at step 220 with linguistic analysis of the subsequent comment on the media post. In these embodiments, comment timestamp program 112 retrieves stored visual and linguistic analysis, categorizations and/or classifications of the media post for the correlation analysis in step 230.

In step 220, comment timestamp program 112 completes a linguistic analysis of the comment. In an embodiment, comment timestamp program 112 completes a linguistic analysis of the comment using NLP to identify whether text of the comment refers to at least one part of the media post based on the visual and linguistic analysis of the media post. In an embodiment in which comment timestamp program 112 identifies, based on the linguistic analysis, that the comment does not reference a specific part of the video, comment timestamp program 112 ends.

In step 230, comment timestamp program 112 determines how the comment correlates to at least one part of the media post using linguistic intent correlation analysis. In other words, comment timestamp program 112 performs linguistic intent correlation analysis to determine a part in the media post the comment most correlates to. In an embodiment, responsive to comment timestamp program 112 identifying that the comment refers to at least one part of the media post, comment timestamp program 112 determines how the reference in the comment correlates to at least one part of the media post using linguistic intent correlation analysis. In an embodiment, comment timestamp program 112 determines whether the comment provides uni-variant correlation, temporal correlation, and/or multi-variant correlation to the media post.

In an embodiment, comment timestamp program 112 determines whether the comment provides uni-variant correlation meaning the comment correlates to only one part of the media post. For example, if a comment references "general relativity" and that topic is only mentioned in one part of a video, then comment timestamp program 112 determines that the comment provides uni-variant correlation to that one specific part of the video. In an embodiment, comment timestamp program 112 determines whether the comment provides temporal correlation meaning the comment includes temporal wording. For example, if a comment states "before he begins talking about general relativity", then comment timestamp program 112 determines that the comment provides temporal correlation to a part of the video.

In an embodiment, comment timestamp program 112 determines whether the comment provides multi-variant correlation meaning the comment correlates to multiple parts of the video. For example, if a comment references "general relativity" and that topic is mentioned in two separate parts of a video, then comment timestamp program 112 determines that the comment has multiple correlations and provides multi-variant correlation. In an embodiment, responsive to determining the comment provides multi-variant correlation, comment timestamp program 112 performs Term Frequency-Inverse Document Frequency (TF-IDF) on each correlation. TF-IDF measures the number of times that a categorized and/or classified object, person, and/or environment appears or is discussed in each correlated part of the media post. In an embodiment, comment timestamp program 112 utilizes TF-IDF to measure a relevance of each instance of a categorized and/or classified object, person, and/or environment to derive which correlation is most relevant to the comment. For example, if a video has multiple references to "general relativity", but the comment states "the laws of quantum physics fit so well with general relativity", then the part of the video that visually shows and/or discusses general relativity and quantum physics is determined to have the highest relevance.

In step 240, comment timestamp program 112 determines a timestamp for the part of the media post referenced in the comment. In an embodiment, comment timestamp program 112 determines a timestamp for the comment to be a timestamp of the part of the media post the comment references or with the highest relevance depending on the type of correlation determined in step 230. In an embodiment, comment timestamp program 112 determines the timestamp for the comment to be a beginning time of the part of the media post. In some embodiments, on top of using the type of correlation determined to determine a timestamp, comment timestamp program 112 determines the timestamp using a statistical model based on traffic distribution throughout the video to determine a confidence level for the timestamp, in which traffic distribution is used to compare which part of the media post has the greatest volume of views by users.

In step 250, comment timestamp program 112 adds the timestamp to the comment. In an embodiment, comment timestamp program 112 generates and adds the timestamp determined in step 240 to the comment. In an embodiment, responsive to comment timestamp program 112 determining the timestamp, comment timestamp program 112 automatically adds the timestamp to the comment. In an embodiment, comment timestamp program 112 generates and adds a clickable timestamp to the comment, i.e., responsive to a user clicking the timestamp, the time cursor of the media post adjusts to the timestamp allowing the user to jump to the part of the media post that comment timestamp program 112 determined was referenced by the comment. For example, responsive to a user commenting "the first experimental test of Einstein's general theory of relativity was brilliant!" on a video lecture, comment timestamp program 112 generates a clickable timestamp of "00:04:45", which is the time the video begins discussing "Einstein's general theory of relativity", and adds the timestamp to the end of the comment.

In step 260, comment timestamp program 112 updates the timestamp in the comment. In an embodiment, comment timestamp program 112 updates the timestamp in the comment based, at least in part, on completing aggregate user re-adjustment analysis for the timestamp. In an embodiment, comment timestamp program 112 completes aggregate user re-adjustment analysis for the timestamp to ensure accuracy of the timestamp. In an embodiment, responsive to a threshold number of subsequent users clicking the timestamp and then re-adjusting the time cursor of the media post, comment timestamp program 112 completes aggregate user re-adjustment analysis for the timestamp. In other words, based on subsequent users re-adjusting the time cursor, comment timestamp program 112 determines that the timestamp in the comment should be updated to more accurately link to the specific topic or part of the media post the comment references.

In an embodiment, comment timestamp program 112 updates the timestamp in the comment based, at least in part, on received feedback from a user corresponding to the added timestamp. In an embodiment, comment timestamp program 112 modifies the timestamp based on the feedback from the user.

In an embodiment, comment timestamp program 112 updates the timestamp in the comment based, at least in part, on dynamically-ranked additional timestamps. In an embodiment in which comment timestamp program 112 determined more than one correlation when performing the linguistic intent correlation analysis, comment timestamp program 112 dynamically-ranks additional timestamps based on a relevance of the additional correlations that comment timestamp program 112 did not determine to be the most relevant. For example, if the user or a subsequent user clicks on the timestamp and then re-adjusts a time cursor in the media post until they find the part in the media post originally referenced in the comment, comment timestamp program 112 sends a prompt with a dynamically-ranked additional timestamp stating "looks like the timestamp was incorrect, is 04:35 what you were looking for?". If the user or subsequent user responds yes, then comment timestamp program 112 updates the timestamp in the comment to the updated timestamp in the prompt. In an embodiment, comment timestamp program 112 sends additional timestamp options in the prompt to the subsequent user based on the dynamic ranking. In an embodiment, responsive to the user or an additional subsequent user clicking that prompted timestamp and not re-adjusting the time cursor, comment timestamp program 112 updates the original timestamp in the original comment to the time of the second timestamp.

In some embodiments, comment timestamp program 112 enables filtering of comments on a media post based on a specific location or geofenced area specified by a user to filter the timestamped comments allowing for further segmentation of comments and usage thereof. In some embodiments, comment timestamp program 112 enables a user to define subgroups for different sections of a media post, e.g., split a video into three parts (Part A, Part B, and Part C) allowing the user to see comments with timestamps based on the part of the media post that the user is commenting on.

Figure 3:
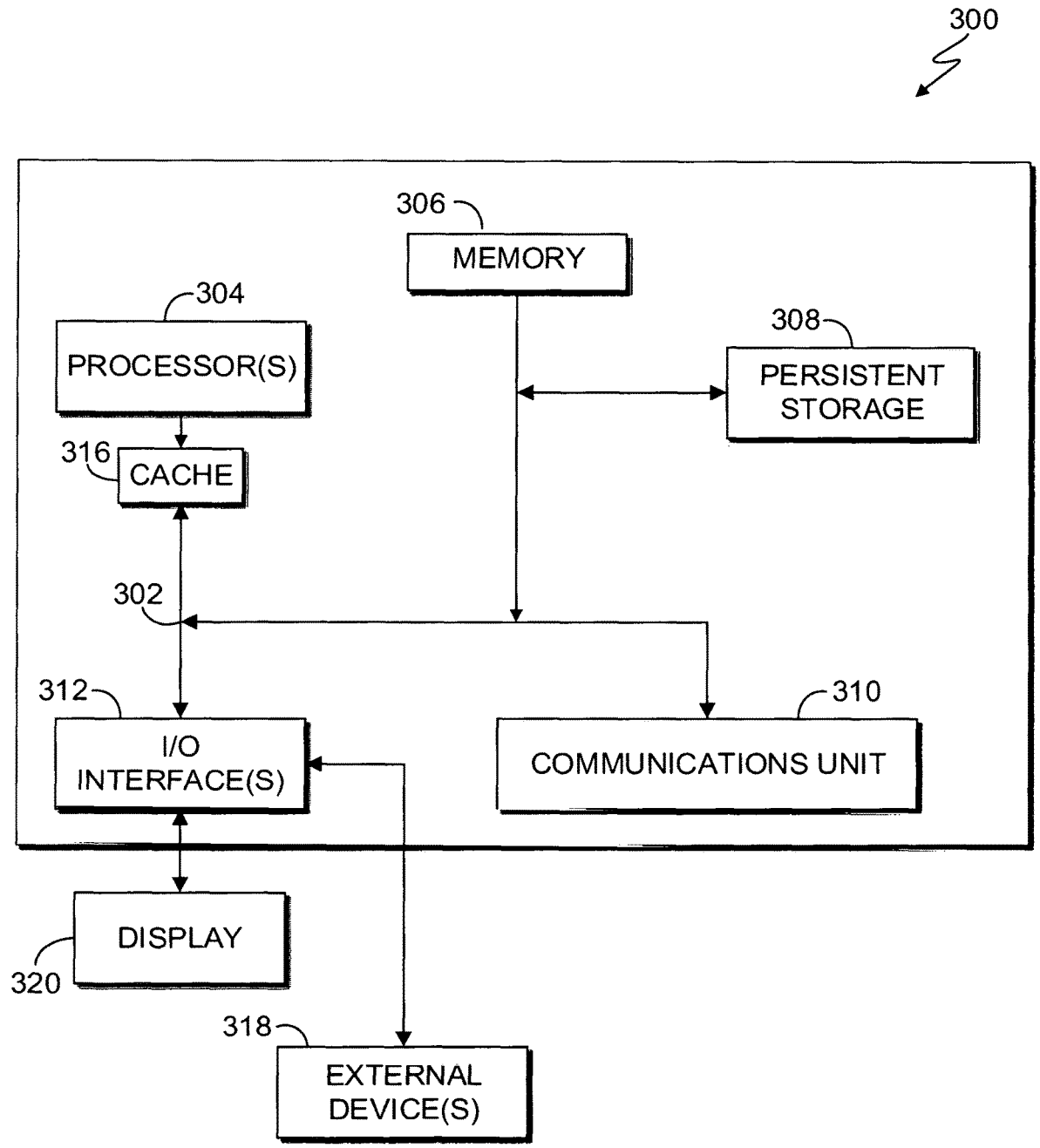
FIG. 3 depicts a block diagram of a computing device of the distributed data processing environment, in accordance with an embodiment of the present invention.

FIG. 3 depicts a block diagram of components of computing device 300 suitable for server 110, computing device 120, and/or media platform 130 in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 300 includes communications fabric 302, which provides communications between cache 316, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses or a crossbar switch.

Memory 306 and persistent storage 308 are computer readable storage media. In this embodiment, memory 306 includes random access memory (RAM). In general, memory 306 can include any suitable volatile or non-volatile computer readable storage media. Cache 316 is a fast memory that enhances the performance of computer processor(s) 304 by holding recently accessed data, and data near accessed data, from memory 306.

Programs may be stored in persistent storage 308 and in memory 306 for execution and/or access by one or more of the respective computer processors 304 via cache 316. In an embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices. In these examples, communications unit 310 includes one or more network interface cards. Communications unit 310 may provide communications through the use of either or both physical and wireless communications links. Programs may be downloaded to persistent storage 308 through communications unit 310.

I/O interface(s) 312 allows for input and output of data with other devices that may be connected to server 110, computing device 120, and/or media platform 130. For example, I/O interface 312 may provide a connection to external devices 318 such as a keyboard, keypad, a touch screen, and/or some other suitable input device. External devices 318 can also include portable computer readable storage media such as, for example, thumb drives, portable optical or magnetic disks, and memory cards. Software and data used to practice embodiments of the present invention can be stored on such portable computer readable storage media and can be loaded onto persistent storage 308 via I/O interface(s) 312. I/O interface(s) 312 also connect to a display 320.

Display 320 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   responsive to receiving a comment on a media post, completing, by one or more processors, a visual analysis and linguistic analysis of content within the media post, wherein:
     the media post was posted by a first user of a plurality of users on a media platform and the media post is one of a plurality of media posts on the media platform, and
     the comment was posted by a second user of the plurality of users on the media platform;
   completing, by the one or more processors, a linguistic analysis of content within the comment;
   performing, by the one or more processors, a linguistic intent correlation analysis to determine a part of the media post that correlates to the comment and whether the comment provides at least one of temporal correlation and multi-variant correlation to the media post;
   determining, by the one or more processors, a timestamp for the part of the media post; and
   adding, by the one or more processors, the timestamp to text of the comment enabling the plurality of users of the media platform to interact with the timestamp.

2. The computer-implemented method of claim 1, further comprising:
   updating, by the one or more processors, the timestamp based, at least in part, on completing an aggregate user re-adjustment analysis for the timestamp.

3. The computer-implemented method of claim 1, wherein the visual analysis of the media post is performed using a machine learning object classifier.

4. The computer-implemented method of claim 1, wherein responsive to determining the comment provides multi-variant correlation to the media post, performing, by the one or more processors, Term Frequency-Inverse Document Frequency (TF-IDF) on each correlation to derive which correlation is most relevant to the comment.

5. The computer-implemented method of claim 1, wherein the timestamp is a clickable link to a time in the media post.

6. The computer-implemented method of claim 1, wherein adding the timestamp to the text of the comment further comprises:
   automatically generating and adding, by the one or more processors, the timestamp to the text of the comment, wherein the timestamp is a clickable link to a time in the media post.

7. A computer program product comprising:
   one or more computer readable storage media and program instructions stored on the one or more computer readable storage media, the program instructions comprising:
   responsive to receiving a comment on a media post, program instructions to complete a visual analysis and linguistic analysis of content within the media post, wherein:
     the media post was posted by a first user of a plurality of users on a media platform and the media post is one of a plurality of media posts on the media platform, and
     the comment was posted by a second user of the plurality of users on the media platform;
   program instructions to complete a linguistic analysis of content within the comment;
   program instructions to perform a linguistic intent correlation analysis to determine a part of the media post that correlates to the comment and whether the comment provides at least one of temporal correlation and multi-variant correlation to the media post;
   program instructions to determine a timestamp for the part of the media post; and
   program instructions to add the timestamp to text of the comment enabling the plurality of users of the media platform to interact with the timestamp.

8. The computer program product of claim 7, further comprising:

program instructions to update the timestamp based, at least in part, on completing an aggregate user readjustment analysis for the timestamp.

9. The computer program product of claim 7, wherein the visual analysis of the media post is performed using a machine learning object classifier.

10. The computer program product of claim 7, wherein responsive to determining the comment provides multi-variant correlation to the media post, program instructions to perform Term Frequency-Inverse Document Frequency (TF-IDF) on each correlation to derive which correlation is most relevant to the comment.

11. The computer program product of claim 7, wherein the timestamp is a clickable link to a time in the media post.

12. The computer program product of claim 7, wherein the program instructions to add the timestamp to the text of the comment further comprise:
 program instructions to automatically generate and add the timestamp to the text of the comment, wherein the timestamp is a clickable link to a time in the media post.

13. A computer system comprising:
 one or more computer processors;
 one or more computer readable storage media;
 program instructions stored on the computer readable storage media for execution by at least one of the one or more processors, the program instructions comprising:
  responsive to receiving a comment on a media post, program instructions to complete a visual analysis and linguistic analysis of content within the media post, wherein:
   the media post was posted by a first user of a plurality of users on a media platform and the media post is one of a plurality of media posts on the media platform, and
   the comment was posted by a second user of the plurality of users on the media platform;
  program instructions to complete a linguistic analysis of content within the comment;
  program instructions to perform a linguistic intent correlation analysis to determine a part of the media post that correlates to the comment and whether the comment provides at least one of temporal correlation and multi-variant correlation to the media post;
  program instructions to determine a timestamp for the part of the media post; and
  program instructions to add the timestamp to text of the comment enabling the plurality of users of the media platform to interact with the timestamp.

14. The computer system of claim 13, further comprising:
 program instructions to update the timestamp based, at least in part, on completing an aggregate user readjustment analysis for the timestamp.

15. The computer system of claim 14, wherein the visual analysis of the media post is performed using a machine learning object classifier.

16. The computer system of claim 13, wherein responsive to determining the comment provides multi-variant correlation to the media post, program instructions to perform Term Frequency-Inverse Document Frequency (TF-IDF) on each correlation to derive which correlation is most relevant to the comment.

17. The computer system of claim 13, wherein the program instructions to add the timestamp to the text of the comment further comprise:
 program instructions to automatically generate and add the timestamp to the text of the comment, wherein the timestamp is a clickable link to a time in the media post.

* * * * *